May 22, 1923.

C. S. RICKER

HEADLIGHT PHOTOMETER

Filed Jan. 12, 1921

1,456,150

WITNESS:
Frank A. Sahle

INVENTOR.
Chester S. Ricker,
BY
Hood Schley.
ATTORNEYS.

Patented May 22, 1923.

1,456,150

UNITED STATES PATENT OFFICE.

CHESTER S. RICKER, OF INDIANAPOLIS, INDIANA.

HEADLIGHT PHOTOMETER.

Application filed January 12, 1921. Serial No. 436,672.

*To all whom it may concern:*

Be it known that I, CHESTER S. RICKER, a citizen of the United States, residing at Indianapolis, in the county of Marion and State of Indiana, have invented a new and useful Headlight Photometer, of which the following is a specification.

The requirements regarding automobile headlight illumination are constantly getting both more severe and more scientific, and these severe requirements are being embodied in the laws of a growing number of States. The present tendency is to specify the maximum candle power of the beam in certain directions and the minimum candle power in certain other directions.

It is the object of my invention to provide a photometer which will indicate at a glance whether or not the headlights of an automobile standing in front of it at a predetermined distance comply with the law.

In carrying out my invention, I provide a screen before which an automobile may be driven so that the beam of light from its headlights falls on the screen, and in this screen I provide—at points which correspond to the requirements of the statute—a number of windows illuminated from the rear in accordance with the maximum or minimum requirements of the statutes for the points at which such windows are located. The illumination of these windows from the rear may be by standard electric lamps at fixed voltage, and if desired this rear illumination may be adjustable. If the illumination from the headlight complies with the law, the windows which correspond to maximum illumination will appear lighter than the surrounding screen, while those which correspond to the minimum illumination will appear darker than the surrounding screen.

Figure 1:
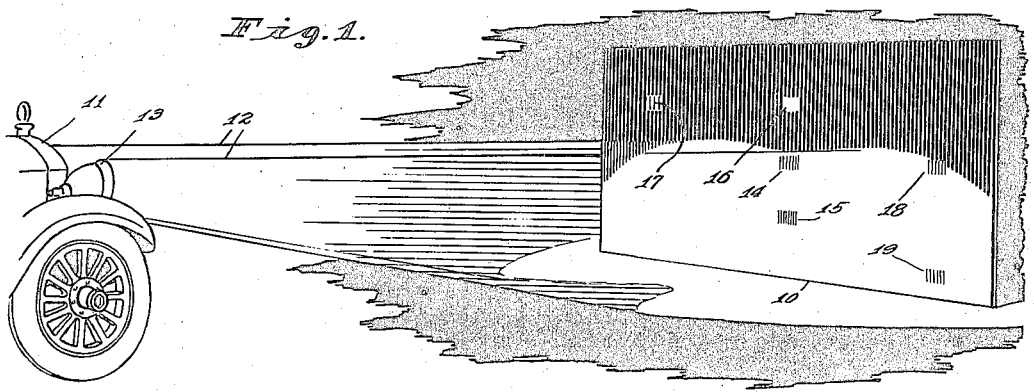
Figure 2:
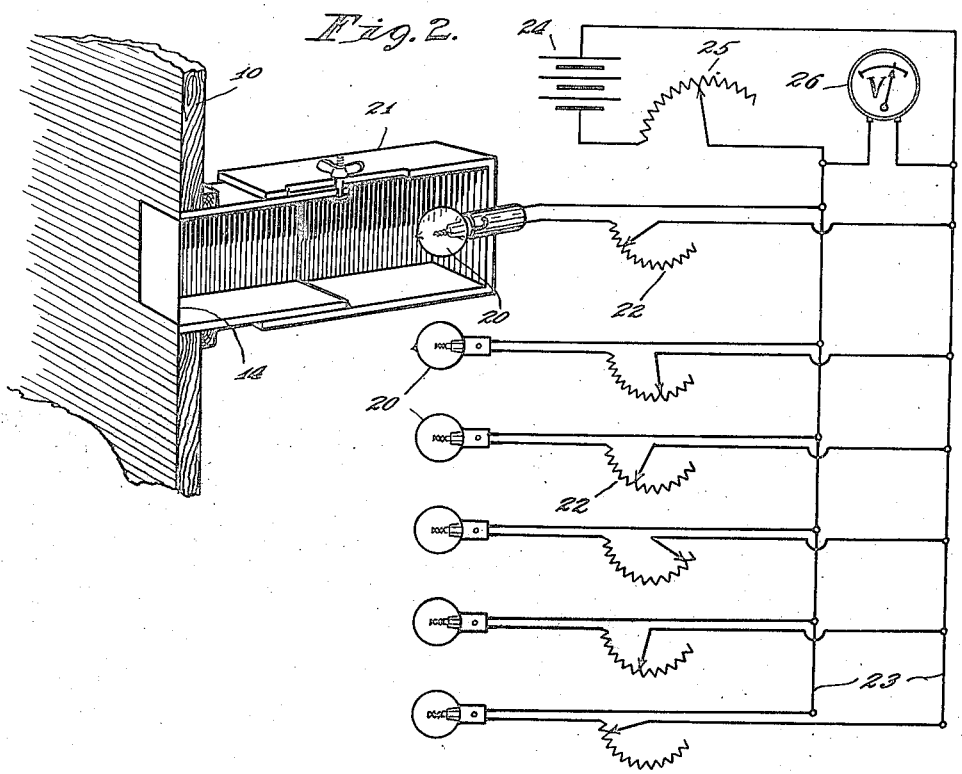

The accompanying drawing illustrates my invention: Fig. 1 is a perspective view of a photometer constructed in accordance with my invention, showing an automobile's headlights playing upon it and the windows indicating conformity to the law; and Fig. 2 is a diagrammatic view of one set of electrical connections for a plurality of lights for the several windows, with one of the lights in an adjustable illuminating box for one of the windows.

The screen 10 is usually supported in an upright position, so that when an automobile 11 is driven to a predetermined position in front of it, say at fifty feet distance, the light beams 12 from the headlights 13 of the automobile will illuminate the screen. In the screen there may be a number of windows 14, 15, 16, 17, 18, and 19, the number of which windows will vary according to the details of the State law involved. As indicated, there are six of these windows, which correspond to the requirements in some States: the window 14 being on the level of the headlights and straight ahead of the middle of the car, where a minimum beam illumination of 2400 beam candle power is required; the window 15 being 1° downward from the window 14, where a minimum beam illumination of 4800 beam candle power is required, the angle of 1° being the angle at the headlights subtended by the distance between the windows 14 and 15; the window 16 being 1° upward from the window 14, where a maximum illumination of 1200 beam candle power is permitted; the window 17 being 1° upward and 4° to the left of the window 14, (or in the direction of the light which may blind an oncoming driver,) where a maximum illumination of 800 beam candle power is permitted; the window 18 being 4° to the right of and on the same level with the window 14, (or in the direction of the light needed to show up a pedestrian at the side of the road,) where a minimum illumination of 1200 beam candle power is required; and the window 19 being 4° to the right and 2° below the window 14, (or in the direction of the light needed to illuminate the ditch,) where a minimum illumination of 2400 beam candle power is required.

The windows 14 to 19 inclusive, in the arrangement shown, are made of some translucent material, such as opal glass or oiled paper, and the surrounding screen is preferably painted as nearly the same color as the windows as is possible. It is not essential, however, that the windows be of translucent material, as under certain circumstances they may be transparent, or mere openings, as in case the illumination from the rear is not a direct illumination. Each window is illuminated from the rear as is indicated in Fig. 2 for the window 14. Conveniently the source of illumination is an electric lamp 20, which is mounted in an illuminating box 21 formed of two telescoping parts so that the distance of the lamp 20 from the window may be adjusted as desired; though if it is once set for a given requirement the adjustment is ordinarily not changed. Each window preferably has its own lamp 20, and in the circuit of each individual lamp may be a rheostat 22 for calibrating purposes. The several lamps 20 are connected in parallel between a pair of leads 23 on which constant voltage is maintained, to maintain constant the proper illumination of the lamps 20. The leads 23 are connected to any suitable source of current, here indicated as a battery 24, through a rheostat 25, by which the voltage across the leads 23 may be regulated to maintain the desired constant voltage, such voltage being indicated by a volt-meter 26 connected across the leads 23.

In setting up the screen, the voltage across the leads 23 is set to the desired voltage, and then the rear illumination of the several windows 14 to 19 inclusive is calibrated by adjusting the individual boxes 21 and rheostats 22. This illuminates the several windows 14 to 19 inclusive with the maximum or minimum illumination required by the statute—the windows 17 and 16 are maximum illuminations and the remaining windows are minimum illuminations in the illustration above given. If the voltage of the current source 24 varies, proper correction may be made for all the lamps in common by adjusting the rheostat 25. Then when a car is driven up before the screen at the proper distance, and its headlights directed on to the screen as indicated in Fig. 1, the windows 16 and 17 will appear light and the remaining windows will appear dark against the surrounding parts of the screen. If this indication is given, the headlights comply with the law. If it is not given, either by having one or more of the windows 16 and 17 appear dark or one or more of the remaining windows appear light, the headlights do not comply with the law.

Thus a ready means is provided for a motorist to test his headlights, and for the police to test the headlights of a suspected offender.

I claim as my invention:

1. A headlight photometer, comprising a screen having a plurality of windows arranged to receive light at predetermined angles from a headlight at a predetermined distance from the screen, and means for illuminating said windows from the rear to individually predetermined values.

2. A headlight photometer comprising a screen provided with a plurality of windows at points corresponding to illumination requirements of a headlight directed upon said screen, and means for illuminating said windows from the rear to the respective maximum or minimum requirements of such points.

3. A headlight photometer, comprising a screen having a number of windows arranged to receive light at individually predetermined angles from a headlight directed upon said screen and at a predetermined distance therefrom, individual illuminating means for the respective windows, and means for varying in common the illumination from the rear of the individual windows.

4. A headlight photometer comprising a screen having a number of windows arranged to receive light at individually predetermined angles from a headlight directed upon said screen and at a predetermined distance therefrom, means for illuminating said windows from the rear, and means for varying the relative illuminations of the several windows.

5. A headlight photometer comprising a screen having a plurality of windows arranged to receive light at individually predetermined angles from a headlight directed upon said screen and at a predetermined distance therefrom, means for illuminating said windows from the rear, and means for individually adjusting the illumination of said windows from the rear.

6. A headlight photometer comprising a screen having a plurality of windows arranged to receive light at individually predetermined angles from a headlight directed upon said screen and at a predetermined distance therefrom, a plurality of electric lamps connected in parallel across a circuit and arranged to illuminate said windows from the rear, and means for adjusting the voltage of said circuit to adjust in common the voltage impressed on all said lamps.

7. A headlight photometer comprising a screen having a plurality of windows, a plurality of electric lamps connected in parallel across a circuit and arranged to illuminate said windows from the rear, means for adjusting the voltage of said circuit to adjust in common the voltage impressed on all said lamps, and means for individually varying the illumination from the rear of the individual windows.

In witness whereof, I have hereunto set my hand.

CHESTER S. RICKER.